Figure 1:
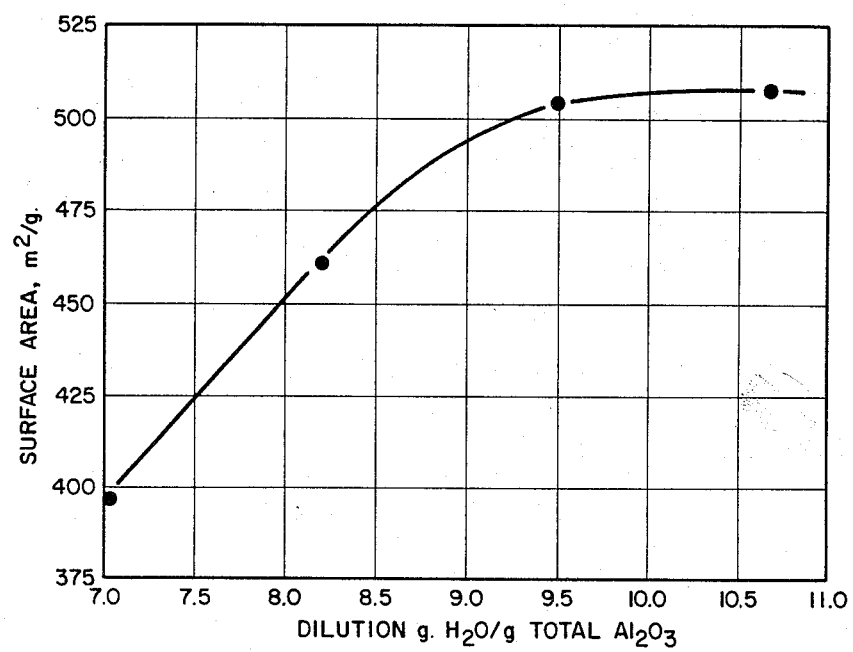

KENNETH K. KEARBY  Inventor

By *George J. Arthary*

Patent Attorney

United States Patent Office 3,342,750
Patented Sept. 19, 1967

3,342,750
COMPOSITIONS CONTAINING STABLE ALUMINUM PHOSPHATE GEL AND METHODS OF MAKING AND USING SAME
Kenneth K. Kearby, Watchung, N.J., assignor to Esso Research and Engineering Company, a corporation of Delaware
Filed Apr. 1, 1965, Ser. No. 444,774
10 Claims. (Cl. 252—437)

This application is filed as a continuation-in-part of Kenneth K. Kearby application Ser. No. 837,807, filed Sept. 3, 1959, now abandoned.

This invention relates to high surface area aluminum phosphate gels, methods of making them, and methods of using them as catalysts or as supports for catalysts.

According to the present invention true hydrogels of aluminum phosphate produce high surface area, heat stable hard gels. These heat stable gels are excellent catalysts for use in catalytic cracking, either alone or in combination with silica or alumina, or with silica and alumina, and other oxides or mixtures of oxides. The aluminum phosphate gel may be impregnated or mixed with hydrogenating agents such as Groups V, VI and VIII oxides or metals, especially cobalt molybdate, nickel and the like. The aluminum phosphate gel prepared according to this invention is itself an excellent catalyst for the dehydration of alcohols to produce olefins or ethers, or for the reverse hydration reactions.

The aluminum phosphate gels having surface areas in the range of 200–600 m.$^2$/g. may be used in place of silica or alumina gels for many other uses. For example, they may be used for compounding rubber or mixed with suitable oils to make greases or used as a paint pigment. The $AlPO_4$ gel is also an excellent adsorbent for separation processes for chromatographic work and for regular dehydration type work. It may also be used for decolorizing oils, for improving the odor of various products, and for removal of mercaptans and sulfides from various hydrocarbon streams. An unusual advantage for this catalyst is the fact that the spent catalyst is useful as a phosphate fertilizer.

The invention includes various methods of producing aluminum phosphate gels and catalysts containing aluminum phosphate gels. It includes special extraction and drying procedures, and special impregnating methods. It includes catalysts which are useful in dehydration, catalytic cracking, hydrofining, hydrogenation, hydrocracking, etc., and the use of these catalysts for these processes.

The present invention also includes cogels of aluminum phosphate, made as true hydrogels with silica or alumina, and these are also useful as catalysts.

While the prior art discloses catalysts containing aluminum phosphate or consisting of aluminum phosphate, there is no teaching in the prior art of producing a true hydrogel of aluminum phosphate in which an aluminum compound is reacted with one of phosphorus to form a true colloidal hydrogel and not a coagulated precipitate. The true hydrogel of the present invention differs and is distinct from previously made and used aluminum phosphate precipitates which were made by precipitating solutions of phosphoric acid and aluminum compounds. In the prior art the aluminum phosphate compounds were precipitates rather than hydrogels, they had relatively low surface areas, and poor heat stability and were only moderately active catalysts.

Figure 2:
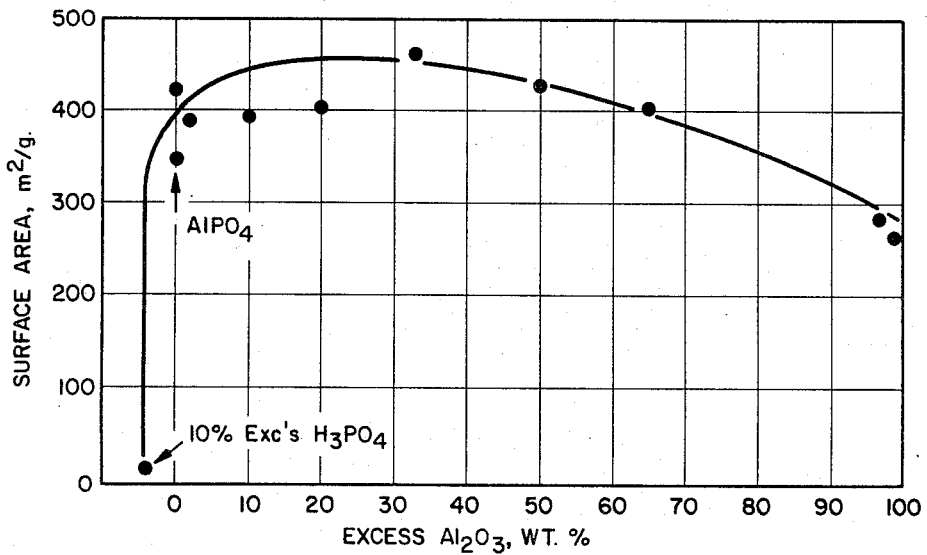

In the drawings:

FIG. 1 represents a graph showing the relationship between surface area of the calcined aluminum phosphate gel and water dilution (ratio of total $H_2O$ by weight to total $Al_2O_3$ by weight) based in preparing the aluminum phosphate hydrogel; and FIG. 2 represents a graph showing relationship between surface area of aluminum phosphate gel and weight of excess $Al_2O_3$ therein.

The preferred method for preparing true aluminum phosphate gels is to react ethylene oxide with a cold aqueous solution of aluminum chloride and phosphoric acid as illustrated by the following equation:

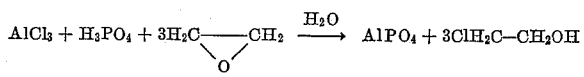

EXAMPLE 1

1160 grams of $AlCl_3 \cdot 6H_2O$ were dissolved in 1163 cc. of distilled water and 300 cc. of 87% phosphoric acid ($H_3PO_4$). This $H_3PO_4$ is equivalent to 97.5% of the aluminum. The solution was held at about 20° F. to 40° F. while stirring and adding portions of liquid ethylene oxide, until a total of about 1130 cc. had been added. When cooling with a Dry Ice-alcohol bath the addition required about 30 minutes. Considerable heat was evolved and initial additions of the ethylene oxide had to be small to avoid temperatures higher than 40° F. The resulting mixture or colloidal sol or solution set to a clear vibrant transparent true colloidal hydrogel in about an hour. The hydrogel had a weight ratio of $H_2O$ to total $Al_2O_3$ of 7.2.

The hydrogel was then broken up into small chunks (0.5 to 1 inch) and a sample of about 100 grams was removed and dried at room temperature and then at above 250° F. The remainder of the hydrogel chunks were put into a modified Soxhlet type extractor with 91% isopropyl alcohol. A volume of alcohol was used to submerge the hydrogel chunks and three additional volumes were used in the boiling flask beneath the extractor.

After two days of extraction, the isopropyl alcohol was poured off and fresh isopropyl alcohol was poured over the chunks of hydrogel and the extraction continued for two more days. The gel remained covered with alcohol during the entire extraction. In place of isopropyl alcohol one may use any volatile, water miscible solvent. For example, ethanol, methanol, acetone, methyl ethyl ketone, etc. are also suitable.

The extraction prevents the formation of carbonaceous material in the gel by removing the ethylene chlorohydrin. It also increases the surface area and gives a more porous catalyst or gel. To reduce the gel cost, the ethylene chlorohydrin extracted from the $AlPO_4$ gel by the isopropyl alcohol can be converted to ethylene glycol or reconverted to ethylene oxide.

The hydrogel chunks were then removed from the extractor, drained, dried at room temperature and then at about 250° F. The resulting dried chunks or pieces of hydrogel were divided into two portions, and one portion was calcined for 48 hours at 1400° F. and the other portion was calcined for 3 hours at 1200° F. The sample above mentioned which was removed before the extraction step was also calcined for 48 hours at 1400° F.

The unextracted portion of hard gel particles or chunks calcined at 1400° F. for 48 hours analyzed 28.4 wt. percent $Al_2O_3$ and 74.7 wt. percent $PO_4$. It had a surface are of 360 m.$^2$/g., a pore volume (PV) of about 0.655 cc./g., and a pore diameter (PD) of 72 angstrom (A.) units. The extracted hydrogel chunks calcined at 1400° F. for 48 hours had a surface area of 428 m.$^2$/g. (square meters per gram), a PV (pore volume) of 0.78 cc./g. and a PD (pore diameter) of 72 A. (angstrom) units. This product analyzed 31.1 wt. percent $Al_2O_3$ and 72.8 wt. percent $PO_4$. The hard $AlPO_4$ gel formed on calcination is amorphous and non-crystalline.

While liquid ethylene oxide was used in the laboratory and in Example 1 at a temperature below 40° F., it is within the purview of the present invention to use gaseous ethylene oxide and bubble it up through the aqueous aluminum chloride-phosphoric acid solution or to place the system under super-atmospheric pressure to liquefy the ethylene oxide and use a higher temperature than 40° F., such as ambient temperature or higher. Or liquid propylene oxide or liquid butylene oxide which have higher boiling points or other higher boiling equivalent alkylene oxides may be used.

EXAMPLE 2

To show the superiority of the aluminum phosphate gels made according to the present invention over the previous methods where the aluminum phosphate is precipitated, an aluminum phosphate was made by a conventional method.

About 474 grams of $AlCl_3 \cdot 6H_2O$ and 130.3 cc. of 87% $H_3PO_4$ were dissolved in water to a volume of about 1800 cc. A solution of $NH_4OH$ (9.1% $NH_3$) was added in about 15 minutes while stirring the first solution to produce a precipitate and until the slurry had a pH of about 7.0. After allowing the slurry to stand about 2 hours, it was filtered. Half of the precipitate was removed and dried at 300° F. and the rest was thoroughly washed with water on the filter and then dried at 300° F. About one-half of the unwashed dried precipitate was washed after drying and before calcination. All samples or portions were calcined at 1200° F. for 3 hours. The dried, not washed portion of the precipitate had a surface area of 114 m.²/g. after 1200° F. calcination. The dried and then washed portion of the precipitate had a surface area of 186 m.²/g. after calcination. The washed and then dried portion of the precipitate had a surface area of 215 m.²/g. When this sample was calcined at 1400° F. for 48 hours its surface area decreased to 102 m.²/g.

It is to be noted that the present invention is distinguishable over previous disclosures on the use of aluminum phosphate in catalysts in the fact that higher surface area, more stable aluminum phosphates have been obtained and give satisfactory catalysts, whereas previous aluminum phosphates were generally unsatisfactory.

The dried and calcined aluminum phosphate gel of the present invention is more heat stable than precipitated aluminum phosphate and other materials as shown in Table I.

TABLE I

| Material | Surface Areas, m.²/g. | | | |
|---|---|---|---|---|
| | New AlPO₄ gel | AlPO₄ ppt. | Al₂O₃ gel | 75 SiO₂-25 Al₂O₃ Aerocat AAA |
| Calcination: | | | | |
| 6 hrs. at 1,200° F | 525 | 215 | 250 | 520 |
| 48 hrs. at 1,400° F | 428 | 102 | 218 | 382 |
| Steamed at 1,050° F., 60 p.s.i.g., 24 hours | 282 | | | 200 |

The $Al_2O_3$ gel in Table I is a stable, commercial alumina (Alorco H–41). The Aerocat is a high alumina, wide pore, commercial, silica-alumina cracking catalyst made by the American Cyanamid Company.

Calcination of catalysts and gels is a well-known step for activating catalysts. Calcination is used to heat catalysts or gels to a temperature the same or slightly above the temperature to which the catalyst will be subjected to in use in the reactor. For example, a cracking catalyst is conventionally calcined at about 800° F. to 1200° F. as this is the same as or slightly higher than the usual cracking temperature. Where the temperature of the reaction is lower, the calcination temperature may be as low as 500° F. and where high temperatures are used, may be as high as 1600° F.

Calcining at a lower temperature gives a higher surface area for the activated aluminum phosphate gel than calcining at a higher temperature. As seen, for example, in Table I, calcination at the lower temperature gave a higher surface area of 525 m.²/gram as compared to a surface area of 428 at the higher temperature.

EXAMPLE 3

The total amount of water present in the hydrogel of Example 1 (including water of hydration) can be increased with a resulting increase in the surface area or pore size of the finished gels after calcination for 48 hours at 1400° F. Results for a series of gels made as set forth in Example 1 which differed only in the amount of water used in making the hydrogel are shown in Table II where weight ratio of total $H_2O/Al_2O_3$ is the weight ratio of total water to total $Al_2O_3$ in the $AlPO_4$ or $AlPO_4$-$Al_2O_3$ hydrogel.

TABLE II

| Wt. Ratio H₂O/Al₂O₃ | Surface Area, m.²/g. | Pore Volume, cc./g. | Pore Diameter, A. |
|---|---|---|---|
| 7.02 | 395 | 0.72 | 72 |
| 8.23 | 461 | 0.73 | 64 |
| 9.46 | 506 | 0.74 | 58 |
| 10.7 | 511 | 0.81 | 64 |

The data from Example 3 are plotted in FIG. 1. These data show that increasing the dilution from 7.0 to 10.7 grams $H_2O$/grams total $Al_2O_3$ increased the porosity from about 0.72 to about 0.81 cc./gram. The surface area increased to a maximum of about 511 m.²/g. Increasing the dilution to about 14 grams $H_2O$/g. $Al_2O_3$ gave a softer gel.

EXAMPLE 4

The gels described in Examples 1 and 3 contained 2.5 weight percent of excess alumina over that stoichiometrically equivalent to the $H_3PO_4$. This gives a more stable gel than is obtained when using equivalent proportions or when using an excess of $H_3PO_4$. Larger proportions of excess alumina may be used to make cogels or plural gels of aluminum phosphate and hydrous alumina in all proportions. A 10% excess of $H_3PO_4$ (87%) over the stoichiometric equivalent of the $Al_2O_3$ reduced the surface are of the $AlPO_4$ gel after calcination to almost zero. In a special study of the effect of excess $H_3PO_4$ or excess $Al_2O_3$, a series of gels was made and calcined as described in Example 1, except that the amounts of $H_3PO_4$ were varied. A gel containing 5.5% less $Al_2O_3$ than that equivalent to the $H_3PO_4$ had a very low surface area of 2 m.²/g. With increasing alumina contents, increased surface areas were obtained up to a composition of 33 wt. percent $Al_2O_3$-67 wt. percent $AlPO_4$. With higher alumina contents, lower surface areas were obtained, but compositions from 20% to 67% $Al_2O_3$ had surface areas of 400 m.²/g. or higher. These results are shown in Table III and in FIG. 2. A 33% $Al_2O_3$-67% $AlPO_4$ gel is preferred for maximum surface area after calcination for 48 hours at 1400° F. All surface areas and pore sizes in this specification were determined by nitrogen adsorption by the B.E.T. method.

TABLE III

| Cc. H₃PO₄ for 1,160 g. AlCl₃.6H₂O | Excess Al₂O₃, Wt. percent | Surface Area, m.²/g. |
|---|---|---|
| 362 | *−5.5 | 2.0 |
| 320 | 0 | 343 |
| 300 | 2.5 | 395 |
| 251 | 10 | 396 |
| 199 | 20 | 406 |
| 146 | 33 | 458 |
| 93 | 50 | 426 |
| 54 | 67 | 400 |
| 5.5 | 96 | 285 |
| 0 | 100 | 260 |

*≏10% excess H₃PO₄.

EXAMPLE 5

The cogels shown in Table III were made with only 7.2 g. $H_2O$/g. $Al_2O_3$. Use of 9.5 g. $H_2O$/g. $Al_2O_3$ increased the surface area of the 33% $Al_2O_3$ catalyst from 458 to 493 m.$^2$/g.

Aluminum phosphate gels made with the increased amounts of water require alcohol extraction to maintain high pore volume and maximum surface area. The 33% $Al_2O_3$-67% $AlPO_4$ cogel made with 9.5 g. $H_2O$/g. $Al_2O_3$, was divided into two parts. One was extracted with isopropyl alcohol before drying and the other dried without extraction. Each portion was divided and samples were calcined for 3 hours at 1200° F. and 48 hours at 1400° F., respectively. The unextracted gels had pore volumes of only 0.34 to 0.40 compared to 0.63 to 0.67 for the alcohol extracted gels as shown in Table IV.

TABLE IV

| Alcohol Extracted | Calcin. Temp., °F. | Surface Area, m²/g. | Pore Volume, cc./g. | Pore Diameter, A. |
|---|---|---|---|---|
| Yes | 1,200 | 527 | 0.63 | 48 |
| Yes | 1,400 | 493 | 0.67 | 54 |
| No | 1,200 | 447 | 0.40 | 36 |
| No | 1,400 | 373 | 0.34 | 36 |

This effect was also observed for a 67% $Al_2O_3$-33% $AlPO_4$ gel, the extracted sample having a pore volume of 1.28 cc./g. and the unextracted sample having a pore volume of 0.756 cc./g.

EXAMPLE 6

An aluminum phosphate aerogel was prepared as follows: A solution was prepared containing 1395 grams of $AlCl_3 \cdot 6H_2O$, 1500 cc. of water and 383 cc. of 87% $H_3PO_4$. This is equivalent to a $H_2O/Al_2O_3$ weight ratio of about 7.2. The resulting mixture or solution was held between about 20° F. and 40° F. while adding small portions of ethylene oxide until 1250 cc. of ethylene oxide were added. During this addition the mixture or solution was stirred. After about an hour the solution set to a clear vibrant hydrogel. The hydrogel was broken up into chunks or pieces which were put in a Soxhlet extractor and extracted with 91% isopropyl alcohol in the same manner as described in Example 1.

A portion of the extracted pieces of hydrogel was removed and the rest of the extracted hydrogel pieces was dried at room temperature and then at increasing temperatures up to about 400° F. Thereafter, these dried hydrogel chunks or pieces were calcined for about 3 hours at 1200° F. and then for about 48 hours at 1400° F. The resulting calcined gel pieces had a surface area of 343 m.$^2$/g.

The extracted sample or portion of hydrogel chunks which was not dried was thoroughly extracted with 99% isopropyl alcohol and then placed in an autoclave and covered with fresh 99% isopropyl alcohol. The closed autoclave was then heated to a temperature of about 500° F. while maintaining a pressure between about 1000 and 2000 p.s.i.g. Then the pressure was slowly released over a period of about 30 minutes and the autoclave evacuated. The resulting aerogel was light brown in color and remained this color after calcination for about 4 hours at 1200° F. and about 3 hours at 1300° F. The calcined aerogel had a surface area of 523 m.$^2$/g., a PV of about 1.56 cc./g. and PD of about 114 A. units.

Aerogels can also be made by this procedure from hydrogels of $AlPO_4$ and silica or of $AlPO_4$ and alumina in all proportions and these aerogels will have a surface area above about at least 250 m.$^2$/g.

EXAMPLE 7

Aluminum phosphate having a high surface area and good stability can also be prepared from aluminum alcoholates. The proportions of reagents which give satisfactory results can vary considerably. However, an example is the use of 1600 cc. of water containing 86 cc. of concentrated hydrochloric acid. Into this is stirred 1480 cc. of a solution containing 70 gms. $Al_2O_3$ per liter, as mixed aluminum amylates in amyl alcohol. To this are added 120 cc. of concentrated phosphoric acid, and the mixture cooled to 40° F. Addition of 100 cc. of ethylene oxide causes the mixture to set to a gel. More rapid setting can be caused by using larger quantities of ethylene oxide, for example, 200 cc. The amounts of HCl and ethylene oxide required are considerably less than the stoichiometric equivalents of $AlCl_3$.

Alternatively the chloride peptized sol of hydrous alumina can be prepared by reacting aluminum metal with dilute hydrochloric acid or with aluminum chloride solution, with or without a mercury catalyst. Or the aluminum metal can be reacted with an acid like acetic acid or formic acid and then HCl can be added and the organic acid evaporated off. Or hydrous alumina can be peptized with HCl. Addition of $H_3PO_4$ followed by ethylene oxide to these sols produces an $AlPO_4$ gel.

EXAMPLE 8

Good aluminum phosphate gels may also be made with reduced amounts of ethylene oxide or with no ethylene oxide as follows:

A solution was made containing 1578 g. $AlCl_3 \cdot 6H_2O$, 2000 cc. $H_2O$, and 434 cc. concentrated $H_3PO_4$. This was stirred while adding dropwise a solution of 1090 cc. concentrated $NH_4OH$ (28% $NH_3$) in 2520 cc. $H_2O$ to form a dilute ammonium hydroxide (8% $NH_3$). The rate of addition was slow enough to avoid the formation of any large amount of precipitate. The final pH was about 1. By this is meant that any precipitate that forms in the zone where the $NH_4OH$ is added will redissolve on being stirred into the bulk or rest of the solution. After standing overnight the solution was cooled to 20° F. and 200 cc. of liquid ethylene oxide added. This is only about 15% of the equivalent ethylene oxide used in Example 1. The mixture set to a gel which was extracted with 91% isopropanol, dried and calcined 3 hours at 1200° F. Its surface area was 427 m.$^2$/g., its pore volume 1.39 cc./g. and its pore diameter 65 A.

The ammonium hydroxide is diluted (8–10% $NH_3$) and is added slowly to the aqueous aluminum chloride-phosphoric acid solution so as not to form a permanent precipitate which does not redissolve on stirring. A small amount of precipitate or haze forms but disappears on further stirring. Another way of stating this is to slowly add a dilute ammonium hydroxide to the aqueous aluminum chloride-phosphoric acid solution until at least about 80% of the stoichiometric equivalent of the chloride of the aluminum chloride has been added in the first step to a pH of about 1.0.

The above method of using reduced amounts of ethylene oxide or no ethylene oxide can be modified in a number of ways. Equally good gels can be made by adding some or all (80%) of the $NH_4OH$ to the $H_3PO_4$ solution and then adding this to the $AlCl_3$ solution. Instead of adding ethylene oxide, the final neutralization may be made by adding a solution of ammonium acetate, urea or ammonium carbonate, hexamethylene tetraamine etc., or by adding dilute ammonium hydroxide 10% ammonia solution to a final pH of 5–6 at a faster rate than in the first step. For example, washed and alcohol extracted gels made with these reagents also have surface areas of 400 m.$^2$/g. or more after calcination at 1200° F. for 3 hours. However, one such washed hydrogel which was not alcohol extracted had a surface area of only 190 m.$^2$/g. and a pore volume of only 0.40 cc./g. If the final neutralization is made by addition of dilute NH₄OH, excess ammonia results in a lower surface area for the alcohol extracted gels. At final precipitation pH values of 6, 7, 8 and 9, surface areas of 401, 372, 356 and 248 were obtained. Thus it is apparent that three preparation variables must be observed to obtain the highest surface area aluminum phosphate gels by precipitation with NH₄OH. These are: (1) very slow addition of NH₄OH; (2) a final pH of 5–6; and (3) removal of water by extraction before drying. When alcohol is used as an extracting material, an alcogel is formed by removal of water from the hydrogel. The harmful effect of water during drying can be partly offset by spray drying or by drying the hydrogel in a boiling solvent such as butanol. The gels made by the methods described in this example have somewhat lower surface areas after calcination at 1200° F. than those described in Examples 1 and 2. However, the areas are sufficient to make them useful as adsorbents and catalysts. The gels made by using ammonium hydroxide, ammonium acetate etc. as just described are also sensitive to water drying. When using ammonium hydroxide as the neutralizing agent, aluminum chloride or aluminum nitrate may be used to react with H₃PO₄.

EXAMPLE 9

The aluminum phosphate gel of the present invention made as described in Example 1 above is superior as a dehydration catalyst to known catalysts. The AlPO₄ gel was used to dehydrate n-pentanol to produce n-pentene. It was compared to alumina which is the best known heterogeneous catalyst for this reaction. The AlPO₄ gel produced more olefins and less coke than alumina gel made from mixed aluminum amylates. The feed rates were equal volumetrically but due to the lighter density of the AlPO₄ gels, the feed rate over it was 1.92 w./hr./w. (weight of alcohol feed per hour per weight of catalyst) vs. 0.92 w./hr./w. for the alumina. The results of this dehydration of n-pentanol are given in Table V.

TABLE V

| Catalyst | Al₂O₃ gel | AlPO₄ gel |
|---|---|---|
| Temp., °F | 650 | 647 |
| Feed Rate: | | |
| W./hr./w | 0.92 | 1.92 |
| V./v./hr | 1.00 | 1.01 |
| Olefin yield, Percent of Theoretical | 77 | 80 |
| Coke, Wt. percent on feed | 0.65 | 0.36 |
| Gas, Wt. percent on feed | 0.5 | 0.5 |

Alcohol dehydrations may be carried out at temperatures between about 400 and 800° F., feed rates of between 0.25 and 10 w./hr./w. and at a pressure of 0.1 to 100 p.s.i.g.

The dehydration of alcohols is useful to obtain special olefins and ethers, and is especially applicable to C₂–C₁₀ alcohols. This catalyst may also be used for the hydration of olefins to alcohols which is a valuable commercial reaction. The AlPO₄ gel of the present invention is also useful for dehydrating ethers, for example, for epoxide dehydration to diolefins. The mixed Al₂O₃-AlPO₄ gels are also excellent catalysts for these dehydration and hydration reactions.

EXAMPLE 10

A pure AlPO₄ gel of the present invention, having a surface area of 428 m.²/g., was used for cracking a gas oil and was compared to commercial silica-alumina catalyst containing 13% alumina. The experiment was carried out in a fixed bed of catalyst using a 650° F.+West Texas gas oil feed. Other feeds such as light oils, heavy naphthas, resins, etc. may also be used. Oil feed rates for the heavy gas oil were 2.0 w./hr./w. at 950° F. and the cracking periods were 2 hours long. Tests were made with and without 15 wt. percent of steam diluent and results are shown in Table VI. The relative activities are relative values for feed rates required for 50% conversion.

TABLE VI

| Catalyst | SiO₂Al₂O₃ | | AlPO₄ gel | |
|---|---|---|---|---|
| | Dry | With Steam | Dry | With Steam |
| Relative Activity, Percent | 100 | 83 | 137 | 56 |
| Motor Octane No.+3 cc | 83.1 | 83.9 | 82.3 | 83.1 |
| Research Octane No.+3 cc | 96.5 | 98 | 95.5 | 97.3 |
| Yields at 50% Conv., Wt. Percent: | | | | |
| C₅–350° F. gasoline | 25.7 | 27.1 | 24.2 | 24.5 |
| C₃+C₄ | 10.5 | | 8.5 | |
| C₃–gas | 8.3 | 7.8 | 10.7 | 9.3 |
| C₁+C₂ | 4.8 | | 5.9 | |
| Carbon | 1.4 | 1.15 | 1.75 | 0.8 |

The AlPO₄ catalyst was more active than silica-alumina when tested dry, but less active when steam dilution was used. The product distributions were generally fairly similar. The new AlPO₄ gel catalyst is an acid catalyst and closely resembles silica-alumina as a cracking catalyst.

EXAMPLE 11

Cracking catalyst can also be made with AlPO₄ plural gels or cogels containing Al₂O₃, B₂O₃ or SiO₂.

The Al₂O₃ containing catalyst was the 33% Al₂O₃-67% AlPO₄ preparation with a surface area of 458 m.²/g. described in Example 4. The boria containing catalyst was made by impregnating an AlPO₄ gel (Example 1) with 15% B₂O₃, by treating it with a methanol solution of boric acid, drying, and calcining 3 hours at 1200° F. to give a surface area of 272 m.²/g.

These catalysts were evaluated in a 600 g. batch, fluid catalyst testing unit, with the 650° F.+W. Texas gas oil, at 950° F., 1.5 catalyst to oil wt. ratio, 1 atmosphere pressure, and 20 minute cycles. They were 45–58% as active as the standard silica-alumina catalyst but gave 2–4% higher gasoline yields as shown in Table VII.

TABLE VII

| | Catalyst | | |
|---|---|---|---|
| | 87 SiO₂ 13 Al₂O₃ | 67 AlPO₄ 33 Al₂O₃ | 85 AlPO₄ 15 B₂O₃ |
| Rel. Activity | 100 | 58 | 45 |
| Yield at 50% Conv.: | | | |
| C₅–430° F. gasoline | 31.9 | 35.9 | 34.3 |
| C₃–gas | 8.3 | 6.3 | 6.8 |
| Coke | 1.4 | 1.06 | 1.15 |
| Res. Oct. No.+3 cc. TEL | 96.5 | 95.9 | 95.4 |
| Motor O.N.+3 cc. TEL | 83.1 | 81.6 | 81.5 |

In addition to the AlPO₄-B₂O₃ catalyst, a catalyst containing both alumina and boria such as

AlPO₄·Al₂O₃·B₂O₃ may be used as a cracking catalyst. The use of 20–60% Al₂O₃ in such catalysts makes them more stable. Maximum surface area is obtained with 20–40% Al₂O₃.

EXAMPLE 12

In addition to AlPO₄ gel alone the present invention includes cogels of alumina and aluminum phosphate and cogels of silica and aluminum phosphate in all proportions as new compositions of matter. Cogels of aluminum phosphate and varying amounts of alumina are made by using a higher ratio of AlCl₃ to H₃PO₄ than is required stoichiometrically. Cogels of silica and aluminum phosphate can be made in all proportions by reacting ethyl silicate with the AlCl₃ solution, before adding the other reagents described in the procedure of Example 1, or by adding ethyl silicate to the AlCl₃-H₃PO₄ solution. It is made to react before the ethylene oxide is added.

For example an 11% $SiO_2$-89% $AlPO_4$ cogel was made as follows:

Ethyl silicate (930 cc.) was added with stirring in 1 hour to a solution of 3480 grams of $AlCl_3 \cdot 6H_2O$ in 6500 cc. of distilled water. Then 960 cc. of 87% $H_3PO_4$ were slowly added in about 15 minutes and stirring continued for 30 minutes. The mixture was cooled to 30° F. and 2500 cc. of ethylene oxide added in small portions with stirring while keeping the temperature of the mixture below about 40° F. The mixture or solution did not set to a gel overnight, and an additional 1000 cc. of ethylene oxide were stirred in the next morning. This caused the mixture to form a firm clear colloidal hydrogel within 10 minutes. The hydrogel was broken up into one inch chunks and extracted 5 times by decantation with 91% isopropyl alcohol. The hydrogel chunks were dried at room temperature, and at 180° F. and at 400° F. and then calcined at 1000° F. for 10 hours. The surface area of the calcined gel was 463 m.²/g. After heating the gel for 48 hours at 1400° F., its surface area was about 400 m.²/g.

The amount of silica in these catalysts is increased by using larger amounts of ethyl silicate and an equivalent proportion of water. By this means catalyst containing 2-75% silica have been prepared. The quantities of reagents used, and the properties of the resulting gels are summarized in Table VIII. The calcination was at 1400° F. for 48 hours unless otherwise noted.

TABLE VIII.—COGELS OF SILICA AND $AlPO_4$

| $SiO_2$, Wt. percent | 2 | 11 | 28.5 | 57 | 75 |
|---|---|---|---|---|---|
| Reagents: | | | | | |
| $AlCl_3 \cdot 6H_2O$, g | 1,160 | 3,480 | 1,160 | 1,160 | 1,160 |
| $H_2O$, g | 1,163 | 6,500 | 2,740 | 6,500 | 14,750 |
| $Et_4SiO_4$, cc | 55 | 930 | 878 | 2,790 | 6,530 |
| 87% $H_3PO_4$, cc | 320 | 960 | 287 | 320 | 289 |
| Ethylene Oxide, cc | 1,245 | 3,500 | 1,200 | 1,420 | 1,260 |
| Properties:* | | | | | |
| S. Area, m.²/g | 403 | 400 | 418 | *477 | 402 |
| Pore Vol., cc./g | 0.77 | | 0.74 | 0.35 | |

*Calcined at 1,000° F. for 16 hours.

When making low $SiO_2$ content cogels (25% or less) it is convenient to react the ethyl silicate with about 5-10 times its volume of $AlCl_3$ solution and then add this to the remaining $AlCl_3$ solution. Isopropanol may be added as a mutual solvent to accelerate this reaction.

When tested as cracking catalysts, these gels showed varying activities above and below that of an 87% $SiO_2$-13% $Al_2O_3$ standard catalyst. The products from cracking were generally similar to those for the commercial silica-alumina catalyst. Results for cracking a refined, white oil are compared in Table IX.

TABLE IX.—SILICA-ALUMINUM PHOSPHATE GEL CATALYSTS

[950° F., 2.7 w./hr./w. white oil, atm. pressure, 2 hr. periods, fixed bed]

| Nominal Composition* | 87 $SiO_2$ 13 $Al_2O_3$ | 75 $SiO_2$ 25 $AlPO_4$ | 50 $SiO_2$ 50 $AlPO_4$ |
|---|---|---|---|
| Surface Area, m²/g.* | | 441 | 546 |
| Pore Dam., Å.* | | 28 | 54 |
| Conversion, Wt. Percent | 68 | 58.5 | 61.2 |
| $C_4$, Wt. Percent | 12.3 | 10.1 | 10.8 |
| $C_5$—350, Wt. Percent: | 37 | 29.9 | 29.6 |
| Aromatics, Vol. Percent | 16.5 | 19.7 | 23.0 |
| Olefins, Vol. Percent | 42.3 | 40.9 | 49.1 |
| Cl. Res. Oct. No | 92.5 | 94.5 | 93.9 |
| Coke, Wt. Percent | 1.0 | 1.1 | 1.64 |
| Gas $C_3$—, Wt. Percent | 7.54 | 6.8 | 8.7 |
| Wet Gas Comp.: | | | |
| n-Butane | 2.75 | 2.24 | 1.92 |
| i-Butane | 18.94 | 18.80 | 16.21 |
| Butenes | 24.69 | 21.90 | 23.51 |

*After 1,200° F. calcination for 3 hours.

Although the $AlPO_4$ containing catalysts were at a slightly lower conversion level, they made higher octane gasoline from this feedstock.

Results for cracking West Texas gas oil at similar condition are summarized in Table X.

TABLE X

[Cracking 650° F.+West Texas gas oil at 950° F., 2.6 w./hr./w., 2 hr. periods]

| | Catalyst | | |
|---|---|---|---|
| | 87 $SiO_2$ 13 $Al_2O_3$ | 89 $AlPO_4$ 11 $SiO_2$ | 43 $AlPO_4$ 57 $SiO_2$ |
| Relative Acitivity (Relative Feed Rates for 50% Conversion) Dry | 100 | 210 | 54 |
| Motor O.N.+3 cc | 83.1 | 83.1 | 84.4 |
| Research O.N. (clear) | 92.5 | 91.5 | 93 |
| $C_5$—430° F., Wt. Percent | 31.9 | 28 | 30.2 |
| Carbon, wt. percent | 1.4 | 2.6 | 2.5 |
| $C_3$ minus gas, Wt. Percent | 8.3 | 9.4 | 9.0 |
| $C_3+C_4$ | 10.5 | 8.8 | 10.1 |
| $C_1+C_2$ | 4.8 | 5.5 | 4.8 |

These results show that the $AlPO_4$-$SiO_2$ catalysts vary considerably, but some are more active than silica-alumina. The $AlPO_4$-$SiO_2$ cracking catalysts having more than 50% of $AlPO_4$ are preferred. Also they are more stable to steam. After being steamed 24 hours at 1050° F. and 60 p.s.i.g. the 11% $SiO_2$-89% $AlPO_4$ catalyst retained a surface area of 307 m.²/g. A very stable, high alumina, commercial silica-alumina catalyst (Aerocat AAA) retained an area of only 200 m.²/g. after similar treatment.

In the above examples starting with Example 10 the conditions for catalytic cracking are not restricted to those given in these examples. For example, for fixed bed operation, the temperature may be between 750° F. and 1050° F., the v./hr./v. may be between about 0.25 and 10, the regeneration temperature between about 900° F. and 1200° F. For fluid bed operations the pressure is substantially atmospheric, the catalyst is powdered or finely divided mostly of a size between about 20 and 100 microns, the temperatures the same as above, the catalyst to oil weight ratio may be between 5 and 20 and the gaseous velocity may be between about 0.5 and 5 feet per second to produce dense turbulent fluidized beds in the reactor and regenerator.

Stable, high surface area gels of $AlPO_4$ and $SiO_2$ can also be prepared by modifications of the method described above. Instead of using ethyl silicate one may add sodium silicate to the $AlCl_3$ solution, while maintaining an acid condition to avoid precipitation. One may then add ethylene oxide, ammonium acetate, or ammonium hydroxide as described above for $AlPO_4$ gels. In this case the sodium salts are washed out with water before the gel is extracted.

Alternatively one may add a silica hydrosol to the $AlPO_4$ hydrosols at a point just preliminary to their forming a gel, for example, right after the ethylene oxide has been added. The silica sol may be made by passing sodium silicate through an ion exchanger, by adding sodium silicate to dilute hydrochloric acid, or by using an ammonium peptized silica sol. Also the $AlPO_4$ hydrogel may be thoroughly mixed with silica hydrogel or gelatinous silica.

EXAMPLE 13

The $AlPO_4$ gels of the present invention are especially good supports for hydrogenating agents such as Group VI oxides and Group VIII metals including especially Ni and compounds such as cobalt molybdate. These supported catalysts are useful in hydrogenation, dehydrogenation, hydrofining, desulfurization, hydroforming, hydrocracking, etc.

Mixed $AlPO_4$-$Al_2O_3$ cogels containing cobalt oxide and molybdenum oxide are 40-50% more active than presently used alumina base hydrofining catalysts. The $AlPO_4$-$Al_2O_3$ base preferably contains about 20-70%

AlPO₄. Mixed AlPO₄-Al₂O₃ cogels containing between about 20% and 70% AlPO₄ are prepared as described in Examples 1 and 4 above. For the production of a 67% AlPO₄ and 33% Al₂O₃ cogel containing cobalt molybdate the following procedure was followed.

A portion of calcined 67 AlPO₄-33 Al₂O₃ cogel from Example 4 was ground to pass through a 100 mesh screen and 175 grams were mixed with 20 grams of MoO₃ powder. The mixture was calcined for 6 hours at 1200° F. to give 194 grams. The cooled, calcined mixture was used as a support and was then impregnated with a solution of 16.7 grams of Co(C₂H₃O₂)₂·4H₂O (cobaltous acetate) in 230 cc. of absolute methanol. The mixture was stirred and heated for about 30 minutes until the excess alcohol was evaporated. The mixture was then dried at 250° F. and calcined for 3 hours at 1100° F. The final weight was 199 grams. The catalyst had a surface area of 322 m.²/g., a PV of 0.405 cc./g. and a PD of 50 A. units. The catalyst was formed into ³⁄₁₆" pills and then granulated to 10–14 mesh size.

This catalyst contained 87.5% (67% AlPO₄-33% Al₂O₃)-10% MoO₃-2.5% CoO.

In two other preparations the 50% Al₂O₃-50% AlPO₄ and the 33% AlPO₄-67% Al₂O₃ cogels prepared in Example 4 were used as starting materials. The same impregnating procedure was used to produce catalysts with the following weight percent compositions:

87.5 (50 AlPO₄-50 Al₂O₃)-10 MoO₃-2.5 CoO
87.5 (33 AlPO₄-67 Al₂O₃)-10 MoO₃-2.5 CoO

While these three preparations include the same relative proportions of MoO₃ and CoO, these proportions may be changed to have 2 to 20% MoO₃ with 0.5 to 10% of CoO. The amount of support will vary accordingly.

The three cobalt molybdate catalysts supported on AlPO₄-Al₂O₃ cogels were evaluated for hydrofining 400–700° F. Kuwait diesel oil containing 1.92% sulfur. The operating conditions included a reactor temperature of about 700° F., a pressure of about 200 p.s.i.g., a gas rate of about 1000 s.c.f. per barrel of feed, a gas composition of about 70 vol. percent of H₂ and 30 vol. percent CH₄ and a liquid v./v./hr. of about 2.

The results obtained with the catalysts of the present invention were compared to those obtained using the same feed and same conditions but with a commercial alumina base catalyst containing 12% MoO₃ and 3.5% CoO. The relative activities of the catalysts are defined as follows:

$$\text{Relative activity} = \frac{\text{Feed rate new cat.} \times 100}{\text{Feed rate commercial cat.}}$$

to obtain the same percent desulfurization. The data are compared in Table XI.

TABLE XI

Catalyst support: Rel. activity
Alumina—100% Al₂O₃ _____ 100
Cogel—67% Al₂O₃ _____ 150
Cogel—50% Al₂O₃ _____ 148
Cogel—33% Al₂O₃ _____ 139

It is to be noted that the 67% AlPO₄ base contains more AlPO₄ than alumina and cannot be regarded as an alumina base. The high activity of a catalyst containing only 33% AlPO₄ gel indicates that good catalysts should result when using as little as 20–25% AlPO₄.

Hydrofining temperatures may range from 200° F. to 800° F., pressures from 15 p.s.i.g. to 1000 p.s.i.g., hydrogen rates from 10 to 500 s.c.f./barrel of feed (containing 25 to 100% by volume of H₂), and feed rates from 0.25 to 20 v./v./hr. The less severe conditions are for naphthas or for hydrogenating diolefins. The severe conditions are for heavier fractions and residual stocks.

The AlPO₄ gel of the present invention is adversely affected by water impregnation. Merely wetting an 11% SiO₂-89% AlPO₄ cogel with water, drying and recalcining at 1400° F. for 48 hours decreased its surface area from about 400 m.²/g. to about 215 m.²/g., whereas steaming it at 60 p.s.i.g. for 24 hours at 1050° F. only decreased it to 307 m.²/g. It is probable that the ethylene chlorhydrin produced in making these gels helps to reduce the harmful effect of water drying, on gels dried without alcohol extraction. For impregnating the new AlPO₄ gels with other materials such as Ni, Co MoO₄, Pt etc., the aqueous impregnating solutions used for alumina supports are not very satisfactory. They result in a loss in surface area as high as 50% or more. In the present case alcoholic cobalt acetate solutions were used and these resulted in losses in surface area of only about 10–20%.

Dry mixing of MoO₃ with the calcined AlPO₄ gel and impregnating the calcined product with an obsolute methanol solution of cobalt acetate gave CoMoO₄ catalysts with surface areas of 300–372 m.²/g.

Aqueous impregnation of the 50% Al₂O₃-50% AlPO₄ support with ammonium molybdate reduced the surface area from 462 m.²/g. to 159 m.²/g. This compares to 381 m.²/g. for the catalyst in which the MoO₃ was dry mixed with the same support and calcined.

Even when dry mixed ten percent MoO₃ has a desurfacing effect on pure AlPo₄ gel similar to that of excess H₃PO₄. Use of more alumina and a lower calcination temperature (1200° F.) suppresses this effect.

The results are summarized in Table XII.

TABLE XII

| Support: | | | |
|---|---|---|---|
| AlPO₄ Wt. percent | 50 | 67 | 100 |
| Al₂O₃ Wt. percent | 50 | 33 | 0 |

| | Impregnation | Surface Area After 6 Hrs. at 1,200° F. | | |
|---|---|---|---|---|
| No MoO₃ | None | 462 | 493 | 343 |
| 10% MoO₃ | Acqueous | 159 | 190 | -------- |
| 10% MoO₃ | Dry mix | 381 | 342 | *12 |
| 10% MoO₃ | Dry mix plus alcohol and cobalt acetate. | 372 | 301 | -------- |

*After calcination for 5 hours at 1,400° F.; also 3.8% MoO₃ evaporated.

Similar results were obtained for impregnations with H₂PtCl₆ solutions. The 67% AlPO₄-33% Al₂O₃ cogel described in Example 4 was impregnated with an aqueous H₂PtCl₆ solution 0.3% Pt on the cogel. After drying at 250° F. and calcination for 48 hours at 1400° F. its surface area was 225 m.²/g. When impregnated similarly with an isopropyl alcohol solution of H₂PtCl₆, its surface area was 383 m.²/g. Catalysts of this type including varying proportions of AlPO₄ and Al₂O₃ as supports also showed loss of surface area when impregnated with aqueous solutions, dried and then calcined.

An even higher surface area Pt catalyst can be made by adding the H₂PtCl₆ to the AlCl₃ solution used to make the AlPO₄ gel or cogel instead of impregnating the calcined gel. These gels may be heat aged for 1–10 hours at 50–90° C. before they are extracted with alcohol, to insure complete precipitation of the platinum. Catalysts with surface areas of 400–500 m.²/g. are thus produced.

Since maximum surface area usually gives increased catalyst activity and life, this represents an advantage for these dry impregnation methods. It is also possible to vaporize impregnating compounds onto these supports. In some cases the lower surface area products of aqueous impregnation also make fairly good catalysts.

EXAMPLE 14

The AlPO$_4$ gel of the present invention is also useful as a support for nickel as a hydrogenating catalyst. For example, a 67% AlPO$_4$-33% Al$_2$O$_3$ gel support impregnated with 10% NiO, 20% NiO and with 20% NiO as NiPO$_4$ is active for hydrogenating benzene to cyclohexane.

The catalysts were prepared by reacting aqueous AlCl$_3$, NiCl$_2$ and H$_3$PO$_4$ with ethylene oxide, using the procedures of Examples 1 and 4. For example the 10% NiO catalyst was made as follows:

1530 grams of AlCl$_3$·6H$_2$O, 169 grams of NiCl$_2$·6H$_2$O and 193 cc. of 87% H$_3$PO$_4$ were dissolved in 2620 cc. of distilled water and held at 20° F. to 40° F. while adding portions of ethylene oxide to a total volume of about 1446 cc. of ethylene oxide. This mixture set to a gel in about 1 hour and synerized forming 840 cc. of clear liquid. The hydrogel was broken up into pieces and was partially dried at room temperature for 16 hours and heated to 180° F. for about 1 hour. It was then extracted with 91% isopropyl alcohol, dried at 75° F. and then to 400° F. and was then calcined 20 hours at 1000° F. The dried gel had a surface area of about 393 m.$^2$/g., PV of about 0.418 cc./g., PD of about 42 A. and Cl of about 0.25 wt. percent.

A sample which was not dried before extraction had the following properties:

S.A. _____ m.$^2$/g__ 474
PV _____ cc./g__ 0.914
PD _____ A__ 78
Cl _____ percent wt__ 0.81

A 20% NiO catalyst was made similarly except the following materials and proportions were used:

NiCl$_2$·6H$_2$O _____ grams__ 380
Distilled water _____ cc__ 3270
Ethylene oxide _____ cc__ 1535

Also the hydrogel was not partially dried before extraction. The catalyst had the following properties:

S.A. _____ m.$^2$/g__ 385
PV _____ cc./g__ 0.665
PD _____ A__ 70
Cl _____ percent wt__ 0.66

Another 20% NiO catalyst was made which differed by adding sufficient H$_3$PO$_4$ to form NiPO$_4$ (299 cc. instead of 193 cc.). The proportions were 80% (67% AlPO$_4$-33% Al$_2$O$_3$)-20% NiO (as NiPO$_4$). The catalyst had a S.A. _____ m.$^2$/g__ 403
PV _____ cc./g__ 0.74
PD _____ A__ 68

These three catalysts were used in hydrogenating benzene. A mixture containing 30% by volume of benzene and 70% by volume of n-heptane was passed over the catalysts at a rate of 1 liquid volume of feed per hour per volume of catalyst (1 v./hr./v.), at a pressure of about 400 p.s.i.g. and with a hydrogen rate of about 2000 s.c.f. per barrel of feed for a 3 hour period. The results are shown in Table XIII.

TABLE XIII

| Catalyst | 67 AlPO$_4$-33 Al$_2$O$_3$ base | | |
|---|---|---|---|
|  | 10% NiO | 20% NiO | 20% NiO (as NiPO$_4$) |
| Temp., °F | 553 | 561 | 564 |
| Benzene Conversion | 99+ | 99+ | 99+ |
| Gas, wt. percent | .07 | 0.72 | 0.33 |
| Coke, wt. percent | .03 | 0.02 | 0.03 |

The above results demonstrate that excellent hydrogenation can be obtained with the AlPO$_4$ gel base catalyst of the present invention.

For hydrogenating aromatics over Group VIII metals on AlPO$_4$ containing supports the conditions may be varied as follows:

Temp., °F. _____ 300 to 800
Press., p.s.i.g. _____ 0 to 2,000
V./v./hr. _____ 0.025 to 10
H$_2$ rate, s.c.f./b. _____ 500 to 15,000

The AlPO$_4$ gel and its cogels with alumina and silica are also excellent supports for Co, Pt, Pd, Rh and for MoO$_3$, Cr$_2$O$_3$ and V$_2$O$_5$ components for hydrogenation. In addition to the hydrogenation of aromatics they may be used for hydrogenating olefins, diolefins, acetylenes, and organic compounds containing sulfur nitrogen and oxygen. They are also active for the hydroisomerization of paraffinic hydrocarbons, especially when they contain added aluminum halides, such as AlBr$_3$ and AlCl$_3$.

EXAMPLE 15

The aluminum phosphate gel and its cogels with alumina and silica are also useful as supports for AlBr$_3$ and AlCl$_3$ for isomerizing and disproportionating hydrocarbons. These catalysts can also contain hydrogenating elements like Pd or Pt and be used under hydrogen pressure.

47.2 gram samples of the gels were placed in a shaking bomb with 23.6 grams of AlBr$_3$, 1 gram of HBr, 160 cc. of isobutane, 38 cc. of n-heptane and 2 cc. of methylcyclohexane. Agitation was contained for 4 hours at 75° F. The supernatent liquid was then drawn off and analyzed by gas chromatography. The results are summarized in Table XIV.

TABLE XIV

Support—isoheptane, wt. percent:
    Pure AlPo$_4$ gel _____ 45
    Cogels:
        67 AlPO$_4$, 33 Al$_2$O$_3$ _____ 41
        67 AlPO$_4$, 33 Al$_2$O$_3$-10 NiO _____ 87

By using temperatues up to 250° F., increased rates of isomerization can be obtained and C$_7$+ paraffins can be converted to iso C$_4$ to iso C$_6$ paraffins. Addition of butane to the feed increases the formation of iso C$_5$ and iso C$_6$ products. One may also use hydrogen pressure when higher temperatures are used. When using H$_2$ pressures, addition of a hydrogenating element like Pt, Pd, Rh, Ni or Co is beneficial. With hydrogen pressures of 200–400 p.s.i.g., temperatures up to 500° F. may be employed. At temperatures of 250–400° F. catalysts containing 5–20% AlCl$_3$ and 0.6% Pt on cogels containing 30–70% Al$_2$O$_3$ are active.

Alumina phosphate gels are good bases for hydrocracking catalysts, as well as hydroisomerization catalysts, when impregnated with active components such as platinum, molybdena, cobalt molybdate, nickel, palladium and other Group VI and Group VIII elements. When used with hydrogen pressures of 200 to 1,000 lbs./sq. inch and at temperatures of 700° to 1050° superior results are obtained in hydrocracking heavy oils or in dealkylating aromatics or in upgrading catalytically cracked gasoline. The use of 0.3 to 1.0% platinum or about 10% molybdena with 2 to 5% of cobalt oxide gives excellent catalysts. It is also possible to use 1–10% of nickel oxide on this support for hydrocracking. The catalysts may also be presulfided before use.

These new gels are useful most catalytic processes which employ alumina or silica gel. For example, they may be used as supports for oxides of Cr or Mo for polymerizing ethylene, propylene, etc. to low and high molecular weight polymers. With added ZnO these gels may be used for reactions of CO and $H_2$ and for CO addition to olefins, or for making butadiene from ethyl alcohol. Compositions containing about 60% aluminum phosphate and 20–40% zinc oxide may be used as supports for platinum, molybdenum, cobalt molybdate, and chromium oxide for use as a dehydrogenation or hydrogenation catalyst. Aluminum phosphate may be impregnated with minor quantities of gallium oxide or the rare earth oxides to make useful catalysts. It is also possible to make phosphate gels of these rare elements by reacting their chlorides and $H_3PO_4$ with ethylene oxide. Alternatively these chlorides can be mixed with $AlCl_3$ solution to form cogels. The rare earth metals include cerium, scandium, yttrium and lanthanum, etc. For example water soluble chlorides of Cr, Mo, Co, Ni, Zr, Ti, V, W, Ta, Fe, Pt, Pd, Rh and the rare earths may be used with $AlCl_3$ in this way.

What is claimed is:

1. A method of making a dry aluminum phosphate gel which comprises reacting an aqueous solution of aluminum chloride and phosphoric acid with ethylene oxide while stirring the mixture, the amount of the aluminum chloride being at least stoichiometrically equivalent to the amount of phosphoric acid and the amount of the ethylene oxide being sufficient to produce gelling, permitting the mixture to set to a clear vibrant transparent true colloidal hydrogel, extracting the hydrogel with an organic water soluble extracting agent, drying the extracted hydrogen and then calcining the dried and extracted hydrogel at a calcination temperature between about 1000° F. and about 1400° F. for a period of time between about 3 hours and about 48 hours to form a dry amorphous aluminum phosphate gel having a surface area of between about 250 and 600 m.$^2$/gram.

2. A method of making a dry aluminum phosphate gel which comprises adding dilute ammonium hydroxide to an aluminum chloride-phosphoric acid solution, the amount of the aluminum chloride being at least stoichiometrically equivalent to the amount of phosphoric acid, at a slow rate to avoid formation of a permanent precipitate which does not redissolve on stirring, to a pH of the solution of about 1.0, then forming a hydrogel by the addition of a compound selected from the group consisting of ammonium acetate, ammonium carbonate, 10% ammonium hydroxide, hexamethylene tetramine and urea to bring the solution to a pH of between about 5 and 9, extracting the hydrogel with an organic water soluble extracting agent, drying the extracted hydrogel and calcining the dried hydrogel at 1200° F. for about 3 hours to produce a dry aluminum phosphate gel having a surface area of about 427 m.$^2$/gram.

3. A method of making a calcined dry gel consisting essentially of aluminum phosphate and having a surface area of at least about 250 m.$^2$/gram which comprises reacting aluminum chloride and phosphoric acid in an aqueous solution and ethylene oxide, the amount of the aluminum chloride being at least stoichiometrically equivalent to the amount of phosphoric acid and the amount of the ethylene oxide being sufficient to produce gelling, at a temperature below about 40° F. to set the mixture to a true transparent vibrant hydrogel, drying, and calcining said dried hydrogel at a calcination temperature for an extended period to produce a dry aluminum phosphate gel.

4. A method of making a dry aluminum phosphate gel which comprises adding dilute ammonium hydroxide to an aluminum chloride-phosphoric acid solution, the amount of the aluminum chloride being at least stoichiometrically equivalent to the amount of phosphoric acid, at a slow rate to avoid formation of a permanent precipitate which does not redissolve on stirring, then forming a hydrogel by the addition at a faster rate of a compound selected from the group consisting of ethylene oxide, ammonium acetate, ammonium carbonate, 10% ammonium hydroxide, hexamethylene tetramine and urea to a pH of between about 5 and 9, extracting the hydrogel with a water miscible organic solvent, drying and calcining the extracted hydrogel to produce a hard gel which has a surface area above 250 m.$^2$/gram after calcination for an extended period at a calcination temperature.

5. A method of making an aluminum phosphate gel which comprises adding dilute ammonium hydroxide to aluminum chloride in phosphoric acid solution, the amount of the aluminum chloride being at least stoichiometrically equivalent to the amount of phosphoric acid, at a slow rate to avoid a permanent precipitate until about 80% of the ammonium hydroxide stoichiometrically equivalent to the chloride has been added, then forming a hydrogel by the addition at a faster rate of a compound selected from the group consisting of ammonium acetate, ammonium carbonate, dilute ammonium hydroxide, hexamethylene tetramine and urea to a pH of between about 5 and 9, extracting the hydrogel with an organic water miscible solvent, drying and calcining the extracted hydrogel for at least 3 hours at a temperature of at least 1000° F. to produce a dry gel which has a surface area above 250 m.$^2$/gram.

6. A method of making aluminum phosphate gel which comprises adding ammonium hydroxide to aluminum chloride in phosphoric acid solution, the amount of the aluminum chloride being at least stoichiometrically equivalent to the amount of phosphoric acid, at a slow rate to avoid formation of permanent precipitate which does not redissolve on stirring to a pH of the solution of about 1.0, forming a hydrogel by the addition at a faster rate of a compound selected from the group consisting of ammonium acetate, ammonium carbonate, dilute ammonium hydroxide, hexamethylene tetramine and urea to a pH of between about 5 and 6, extracting the hydrogel with an organic water soluble extracting agent, drying the extracted hydrogel and calcining the hydrogel at 1200° F. for about 3 hours to produce a dry aluminum phosphate gel having a surface area of about 427 m.$^2$/gram.

7. A method of making a dry aluminum phosphate gel which comprises reacting in stoichiometric proportions aluminum chloride and phosphoric acid in aqueous solution with sufficient liquid ethylene oxide to produce gelling, stirring the mixture and maintaining it at about 40° F. permitting the mixture to set to a clear vibrant transparent true colloidal hydrogel, extracting the hydrogel with isopropyl alcohol, drying the extracted hydrogel and then calcining the dried and extracted hydrogel at a temperature between about 1000° F. and 1400° F. for a period between about 3 hours and 48 hours to form a dry amorphous aluminum phosphate gel having a surface area between about 250 and 600 m.$^2$/gram.

8. A method of making an aluminum phosphate dry gel of high surface area which comprises forming a water solution of an aluminum salt selected from the class consisting of aluminum chloride and aluminum nitrate, and phosphoric acid in stoichiometric proportions, adding ammonium hydroxide to increase the pH but insufficient to form a permanent precipitate which does not redissolve on stirring, then adding urea to increase the pH to between about 5 and 9 to form a transparent vibrant aluminum phosphate hydrogel, treating said hydrogel to remove contaminating material and drying said treated hydrogel to form a dry gel.

9. A dry heat stable calcined aluminum phosphate gel which has a surface area of at least 250 m.$^2$/gram and which consists essentially of aluminum phosphate and which contains no more than about 2.5 wt. percent of alumina in excess of the stoichiometric amount in aluminum phosphate.

10. A calcined dry aluminum phosphate gel consisting essentially of aluminum phosphate and having a surface area between about 250 and 600 m.$^2$/gram.

References Cited

UNITED STATES PATENTS

| | | | |
|---|---|---|---|
| 2,301,913 | 11/1942 | Veltman | 208—114 |
| 2,816,079 | 12/1957 | White | 252—317 |
| 2,898,306 | 8/1959 | Cramer et al. | 252—463 |
| 2,938,874 | 5/1960 | Rosinski et al. | 252—437 |
| 2,955,915 | 10/1960 | Bicek | 252—463 |
| 3,088,908 | 5/1963 | Hansford | 252—435 |

OTHER REFERENCES

Dhar et al.: "Studies in Hydrous Aluminum Oxide-Phosphoric Acid and Hydrous Ferric Oxide-Phosphoric Acid Neutralization," Proceedings of the National Academy of Sciences India, vol. (XXV), pages 529–33 (1955).

OSCAR R. VERTIZ, *Primary Examiner.*

BENJAMIN HENKIN, *Examiner.*

R. M. DAVIDSON, A. J. GREIF, *Assistant Examiners.*